United States Patent
Russell et al.

(10) Patent No.: US 12,179,798 B2
(45) Date of Patent: Dec. 31, 2024

(54) TREE POLICY PLANNING FOR AUTONOMOUS VEHICLE DRIVING SOLUTIONS

(71) Applicant: WAYMO LLC, Mountain View, CA (US)

(72) Inventors: Jared Stephen Russell, San Francisco, CA (US); Clovis Scotti, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 867 days.

(21) Appl. No.: 17/132,806

(22) Filed: Dec. 23, 2020

(65) Prior Publication Data

US 2021/0139048 A1 May 13, 2021

Related U.S. Application Data

(63) Continuation-in-part of application No. 16/210,652, filed on Dec. 5, 2018, now Pat. No. 11,192,545.

(51) Int. Cl.
*B60W 60/00* (2020.01)

(52) U.S. Cl.
CPC .... *B60W 60/0016* (2020.02); *B60W 60/0011* (2020.02); *B60W 60/00274* (2020.02);
(Continued)

(58) Field of Classification Search
CPC ......... B60W 60/0016; B60W 60/0011; B60W 60/00274; B60W 2554/4041;
(Continued)

(56) References Cited

U.S. PATENT DOCUMENTS 6,510,388 B1 * 1/2003 Sporrong ............... G08G 5/045
                                                          342/455
8,126,642 B2   2/2012 Trepagnier et al.
(Continued)

FOREIGN PATENT DOCUMENTS

EP          2814014 A1 * 12/2014    ......... G06K 9/00785

OTHER PUBLICATIONS

English translation of EP-2814014-A1 (Year: 2014).*

*Primary Examiner* — Anshul Sood
*Assistant Examiner* — Matthew Ho
(74) *Attorney, Agent, or Firm* — Botos Churchill IP Law

(57) ABSTRACT

An autonomous vehicle is operated along a route according to a nominal driving solution that takes into account one or more first constraints including a first predicted trajectory for an agent vehicle. An alternate scenario is determined based on one or more second external constraints that include a second predicted trajectory for the agent vehicle different from the first predicted trajectory. A risk factor on the nominal driving solution is determined for the alternative scenario, and a secondary driving solution is determined based on the risk factor and the one or more second external constraints. A candidate switching point is identified where the secondary driving solution diverges from the nominal driving solution, and the nominal driving solution is revised up to the candidate switching point based on the secondary driving solution. The autonomous vehicle is then operated based on the revised nominal driving solution.

20 Claims, 11 Drawing Sheets

(52) U.S. Cl.
CPC . *B60W 2552/53* (2020.02); *B60W 2554/4041* (2020.02); *B60W 2554/4042* (2020.02); *B60W 2554/4044* (2020.02)

(58) Field of Classification Search
CPC ..... B60W 2552/53; B60W 2554/4042; B60W 2554/4044
See application file for complete search history.

(56) References Cited

U.S. PATENT DOCUMENTS

| | | |
|---|---|---|
| 8,521,415 B2 | 8/2013 | Harada |
| 8,676,466 B2 | 3/2014 | Mudalige |
| 9,098,086 B2 | 8/2015 | Humphrey |
| 9,645,577 B1 | 5/2017 | Frazzoli et al. |
| 9,910,441 B2 | 3/2018 | Levinson et al. |
| 10,009,580 B2 * | 6/2018 | Offenhaeuser ....... G06V 20/597 |
| 10,691,127 B2 | 6/2020 | Kobilarov et al. |
| 10,955,842 B2 | 3/2021 | Zeng et al. |
| 11,643,072 B2 | 5/2023 | Beller |
| 11,643,073 B2 | 5/2023 | Dax |
| 2011/0313664 A1 | 12/2011 | Sakai et al. |
| 2016/0001775 A1 * | 1/2016 | Wilhelm ............. B60W 30/085 701/25 |
| 2016/0313133 A1 * | 10/2016 | Zeng ................. B60W 60/0011 |
| 2017/0123422 A1 | 5/2017 | Kentley et al. |
| 2019/0111874 A1 | 4/2019 | Harada |
| 2019/0278280 A1 * | 9/2019 | Imai ................... B60K 31/0008 |
| 2019/0302777 A1 | 10/2019 | Kindo |
| 2020/0089246 A1 * | 3/2020 | McGill, Jr. .......... G05D 1/0214 |
| 2020/0110416 A1 | 4/2020 | Hong et al. |
| 2021/0402991 A1 | 12/2021 | Gautam et al. |

\* cited by examiner

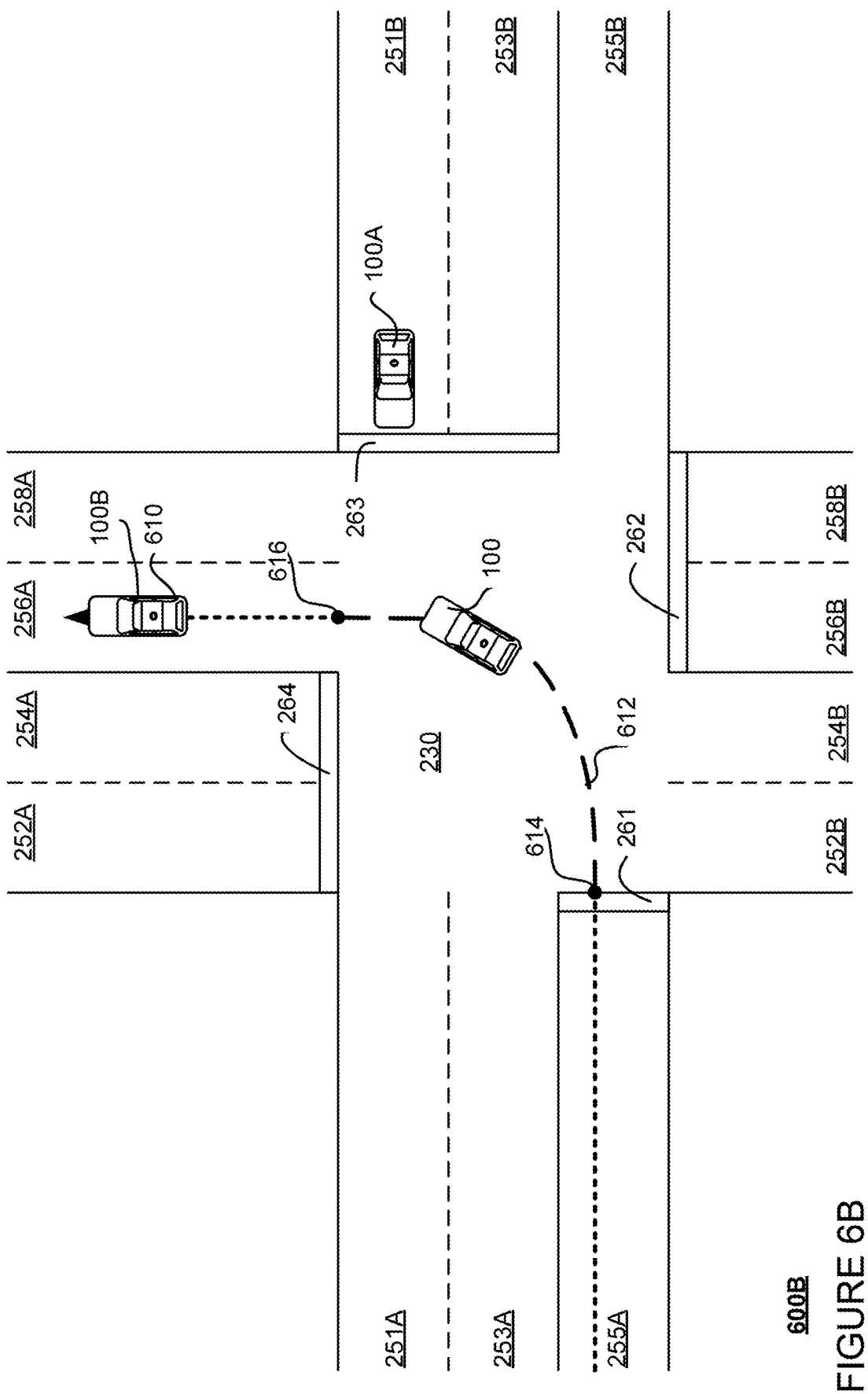

TREE POLICY PLANNING FOR AUTONOMOUS VEHICLE DRIVING SOLUTIONS

CROSS-REFERENCE

This application is a continuation-in-part of U.S. application Ser. No. 16/210,652, filed Dec. 5, 2018, the disclosure of which is incorporated by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). These characteristics can be used to predict trajectories of other objects. These trajectories may define what an object is likely to do for some brief period into the future. These trajectories can then be used to compute a vehicle trajectory that avoids these objects. Thus, detection, identification, and prediction are critical functions for the safe operation of autonomous vehicle.

BRIEF SUMMARY

Aspects of the disclosure provide for a method for implementing tree policy planning for autonomous vehicle driving solutions and operating an autonomous vehicle. The method includes detecting, by one or more computing devices, an agent vehicle in the vehicle's environment; determining, by the one or more computing devices, a nominal driving solution for the vehicle along a portion of a route based on one or more first external constraints, the one or more first constraints including a first predicted trajectory of a plurality of possible trajectories for the agent vehicle; determining, by the one or more computing devices, an alternate scenario that includes one or more second external constraints that are different from the one or more first external constraints, the one or more second external constraints including a second predicted trajectory of the plurality of possible trajectories for the agent vehicle; determining, by the one or more computing devices, a risk factor on the nominal driving solution for the alternative scenario; determining, by the one or more computing devices, a secondary driving solution based on the risk factor and the one or more second external constraints in the alternative scenario; identifying, by the one or more computing devices, a candidate switching point where the secondary driving solution diverges from the nominal driving solution; revising, by the one or more computing devices, the nominal driving solution up to the candidate switching point based on the secondary driving solution; and operating, by the one or more computing devices, the vehicle based on the revised nominal driving solution.

In one example, the determining the nominal driving solution includes selecting the one or more first constraints that allow a most progress of the vehicle along the portion of the route. In another example, the determining the nominal driving solution includes selecting the one or more first constraints that are most likely to occur along the portion of the route. In a further example, the determining of the alternate scenario includes selecting the one or more second external constraints based on a minimum likelihood of occurring. In yet another example, the determining of the alternate scenario includes selecting the one or more second external constraints based on a minimum level of risk posted to the vehicle along the portion of the route.

In a still further example, the determining the risk factor is based on where along the portion of the route that a level of risk to the vehicle posed by the alternate scenario exceeds a maximum level of risk. In another example, the candidate switching point is where a threshold confidence level is reached regarding whether the alternate scenario has occurred. In a further example, the revising of the nominal driving solution includes adjusting a speed profile to prepare the vehicle for a potential switch to the secondary driving solution.

Other aspects of the disclosure provide for a system that includes a perception system; and one or more computing devices. The one or more computing devices is configured to detect, using the perception system, an agent vehicle in an autonomous vehicle's environment; determine a nominal driving solution for the vehicle along a portion of a route based on one or more first external constraints, the one or more first constraints including a first predicted trajectory of a plurality of possible trajectories for the agent vehicle; determine an alternate scenario that includes one or more second external constraints that are different from the one or more first external constraints, the one or more second external constraints including a second predicted trajectory of the plurality of possible trajectories for the agent vehicle; determine a risk factor on the nominal driving solution for the alternative scenario; determine a secondary driving solution based on the risk factor and the one or more second external constraints in the alternative scenario; identify a candidate switching point where the secondary driving solution diverges from the nominal driving solution; revise the nominal driving solution up to the candidate switching point based on the secondary driving solution; and operate the vehicle based on the revised nominal driving solution.

In one example, the nominal driving solution is determined based on the one or more first constraints that allow a most progress of the vehicle along the portion of the route. In another example, the nominal driving solution is determined based on the one or more first constraints that are most likely to occur along the portion of the route. In a further example, the alternate scenario is determined based on the one or more second constraints that have a minimum likelihood of occurring and based on the one or more second external constraints that have a minimum level of risk posted to the vehicle along the portion of the route.

In yet another example, the risk factor is determined based on where along the portion of the route that a level of risk to the vehicle posed by the alternate scenario exceeds a maximum level of risk. In a still further example, the candidate switching point is where a threshold confidence level is reached regarding whether the alternate scenario has occurred. In another example, the nominal driving solution is revised based on an adjusted speed profile that prepares the vehicle for a potential switch to the secondary driving solution. In a further example, the system also includes the vehicle.

Further aspects of the disclosure provide for a non-transitory, tangible computer-readable medium on which computer-readable instructions of a program are stored. The instructions, when executed by one or more computing devices, cause the one or more computing devices to perform a method for operating an autonomous vehicle. The method includes detecting an agent vehicle in the vehicle's environment; determining a nominal driving solution for the vehicle along a portion of a route based on one or more first external constraints, the one or more first constraints including a first predicted trajectory of a plurality of possible trajectories for the agent vehicle; determining an alternate scenario that includes one or more second external constraints that are different from the one or more first external constraints, the one or more second external constraints including a second predicted trajectory of the plurality of possible trajectories for the agent vehicle; determining a risk factor on the nominal driving solution for the alternative scenario; determining a secondary driving solution based on the risk factor and the one or more second external constraints in the alternative scenario; identifying a candidate switching point where the secondary driving solution diverges from the nominal driving solution; revising the nominal driving solution up to the candidate switching point based on the secondary driving solution; and operating the vehicle based on the revised nominal driving solution.

In one example, the determining the nominal driving solution includes selecting the one or more first constraints that allow a most progress of the vehicle along the portion of the route. In another example, the determining the nominal driving solution includes selecting the one or more first constraints that are most likely to occur along the portion of the route. In a further example, the determining the risk factor is based on where along the portion of the route that a level of risk to the vehicle posed by the alternate scenario exceeds a maximum level of risk.

BRIEF DESCRIPTION OF THE DRAWINGS

FIGS. 6A-6C are examples of various situations in accordance with aspects of the disclosure.

DETAILED DESCRIPTION

Overview

Figure 1:
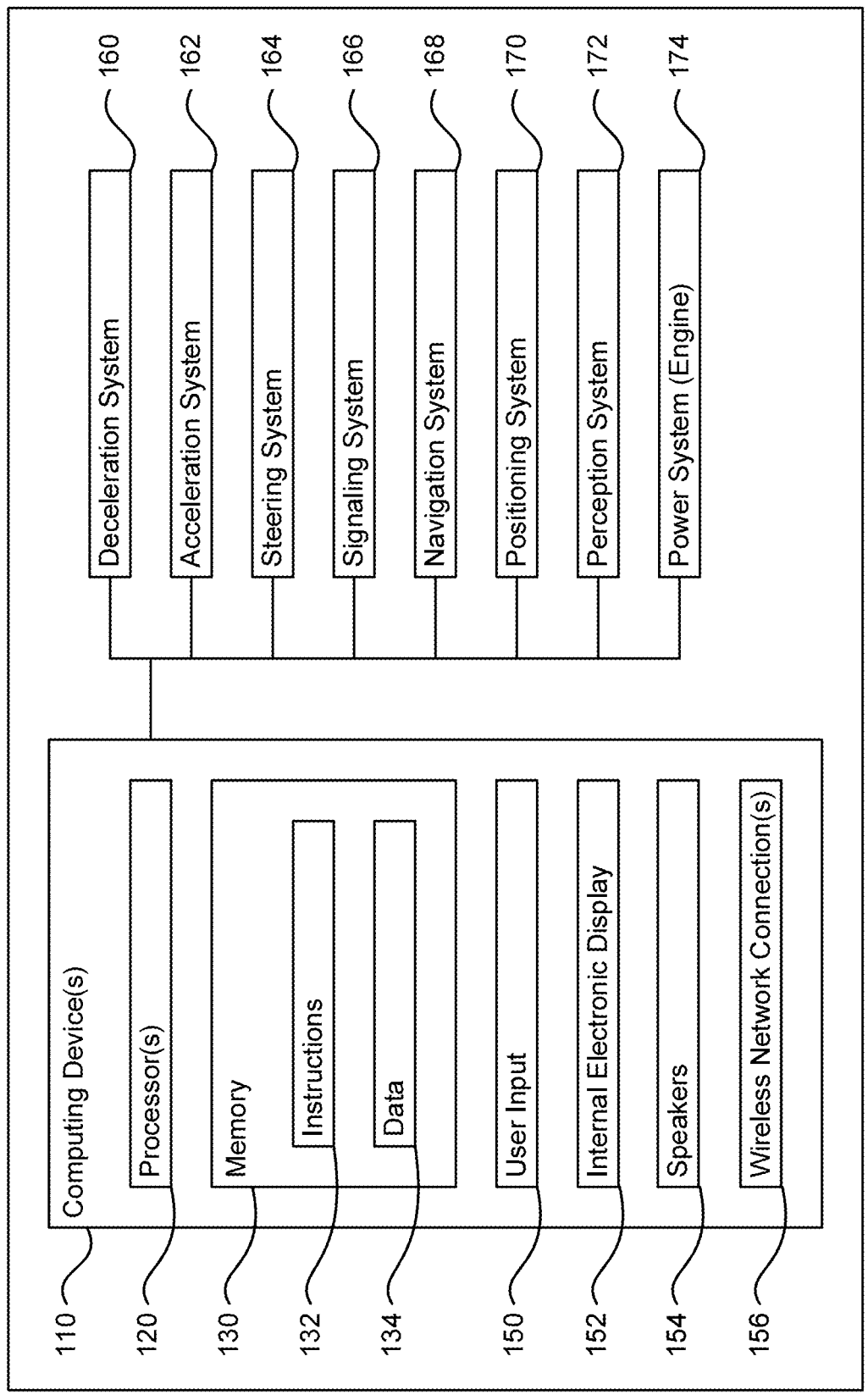
FIG. 1 is a functional diagram of an example vehicle in accordance with aspects of the disclosure.

The technology relates to a tree planning policy for one or more driving solutions for a given portion of a route for an autonomous vehicle based on one or more constraints. As the vehicle is navigated along a route, the vehicle's computing devices have to plan a driving solution for a given portions of the route in response to other agents on the road. In this regard, one or more sensors of the vehicle may detect these other agents and their characteristics (position, shape, heading, speed, etc.). Based on the detected characteristics, the vehicle's computing devices may predict possible trajectories for the detected agents that allow for good forward progress for the autonomous vehicle that avoids any close collisions with detected agents. Based on the predicted trajectories, the vehicle's computing devices may determine a nominal driving solution for the given portion of the route that avoids the detected agents.

After determining the nominal driving solution, the vehicle's computing devices may revise the nominal driving solution using tree policy planning so that the autonomous vehicle may be prepared for any likely scenario unaccounted for in the nominal driving solution. This way, the autonomous vehicle can mitigate the risk caused by likely scenarios, such as non-cooperating trajectories of detected agents, while making good progress along the route. In particular, a risk factor along the nominal driving solution may be determined where a likely scenario may add a threshold amount of risk to the nominal driving solution. There may be multiple risk factors along the nominal driving solution based on different contributing factors. A secondary driving solution for each risk factor may be determined based on the associated scenario. A candidate switching point before the risk factor may be determined where a secondary driving solution should diverge from the nominal driving solution to avoid the risk factor, where it is predicted that a determination may be made regarding whether the scenario associated with the risk factor has occurred, and/or where it is predicted that a determination may be made regarding whether the scenario associated with the risk factor has been addressed. In some implementations, whichever location associated with the risk factor occurs earliest may be used as the candidate switching point. For each additional likely scenario, an additional risk factor, secondary driving solution, and candidate switching point may be determined. Candidate switching points may be grouped together into one aggregate candidate switching point, which increases efficiency and saves computational resources.

To account for the likely scenario or scenarios, the nominal driving solution may be revised so that the secondary driving solution is a possible trajectory for the autonomous vehicle up until a next candidate switching point without exceeding a maximum discomfort level. For example, the nominal driving solution may be revised to have a slower speed up until the candidate switching point. The vehicle's computing devices may then operate the autonomous vehicle using the revised nominal driving solution.

The tree planning policy may be repeated continually or incrementally to plan for next portions of the route. As time passes and more data is acquired, the uncertainty surrounding the predictions for other agents collapses, and the intents of the other agents become clearer. Therefore, repeating the tree planning policy updates the driving solution for the autonomous vehicle to take into account the additional data. In some cases, when it becomes clear that the other agents the likely scenario, the updated driving solution using the tree planning policy may be the same or similar to the secondary driving solution. The tree planning policy may be repeated continually or incrementally.

The features described above may allow for an autonomous vehicle to be able navigate assertively while mitigating the risk for any unlikely-but-potentially-high-severity collisions. The vehicle as described herein will have the ability to plan to avoid such risk while still providing as comfortable a ride as possible for a passenger of the vehicle. The autonomous vehicle is able to proceed along a route safely without having to slow or stop as frequently to account for the uncertain behavior of other agents on the road. In addition, because the tree planning policy creates a plurality of scenarios with fewer constraints for each scenario, which means the computations required at the vehicle are easier and potentially faster than solving for all the possible constraints. Processing may therefore be performed more efficiently and with fewer resources.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of the vehicle." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own CPU or other processor, memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100. The one or more computing device 110 of vehicle 100 may also receive or transfer information to and from other computing devices, for instance using wireless network connections 156.

In one example, computing device 110 may be an autonomous driving computing system incorporated into vehicle 100. The autonomous driving computing system may be capable of communicating with various components of the vehicle. For example, computing device 110 may be in communication with various self-driving systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing device 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing device 110.

Figure 2:
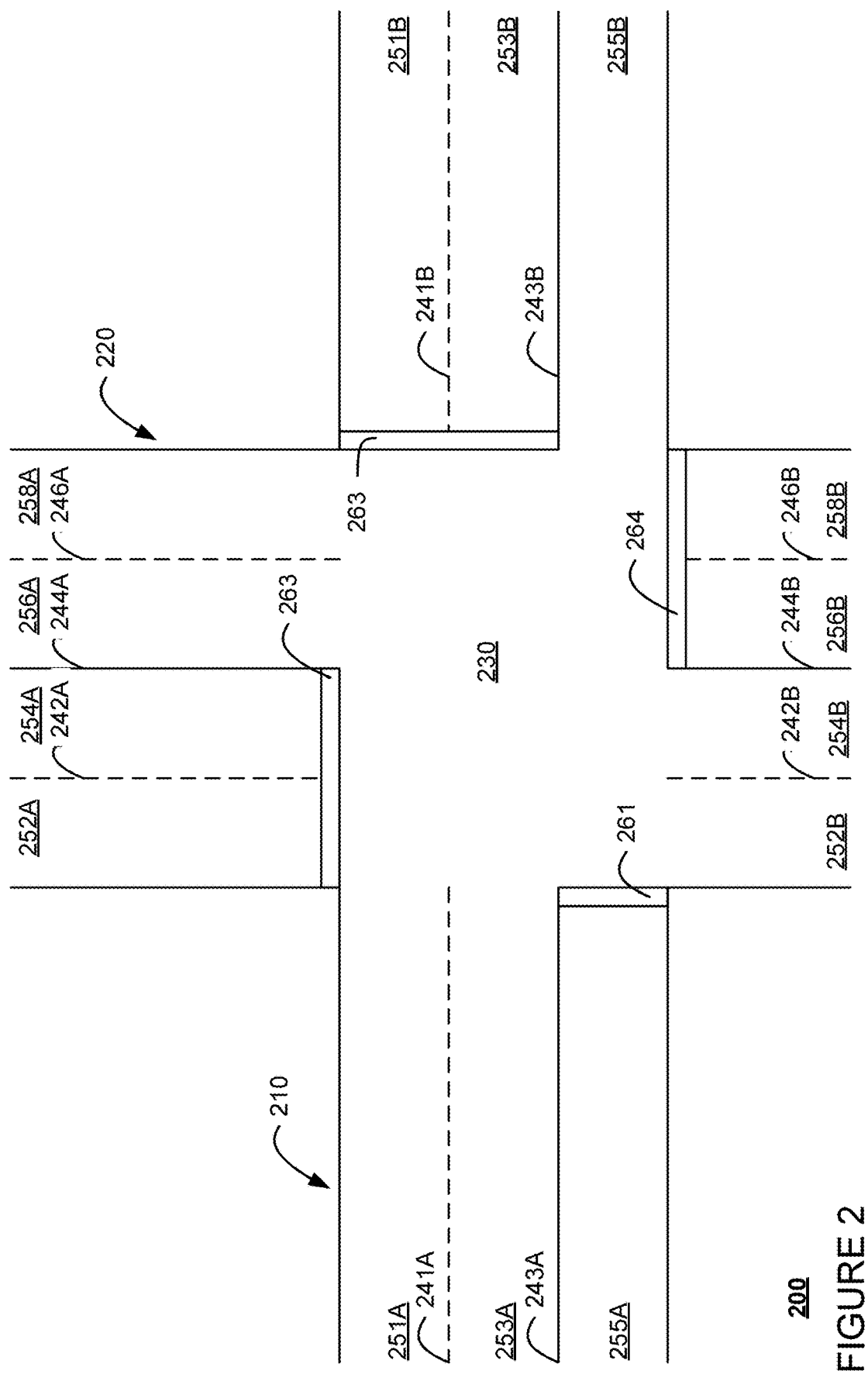
FIG. 2 is an example map information in accordance with aspects of the disclosure.

FIG. 2 is an example of map information 200 for a section of roadway including intersection 230. In this example, map information 200 depicts a portion of the map information that includes information identifying the shape, location, and other characteristics of various features. For example, map information 200 includes road 210 and road 220 intersecting at intersection 230. Map information 200 includes lane markers or lane lines 241A and 243A of road 210 on one side of intersection 230, lane lines 241B and 243B of road 210 on the other side of intersection 230, lane lines 242A, 244A, and 246A of road 220 on one side of intersection 230, and lane lines 242B, 244B, and 246B of road 220 on the other side of intersection 230. The lane lines may also define various lanes, such as lanes 251A, 253A, and 255A of road 210 on one side of intersection 230, lanes 251B, 253B, and 255B of road 210 on the other side of intersection 230, lanes 252A, 254A, 256A, and 258A of road 220 on one side of intersection 230, and lanes 252B, 254B, 256B, and 258B of road 220 on the other side of intersection 230. The lanes may be explicitly identified in the map information 200 as shown, or may be implied by the width of a road. Map information 200 may also identify bicycle lanes. As shown, map information 200 may also include stop lines 261 and 263 for road 210, and stop lines 262 and 264 for road 220.

In addition to these features, the map information 200 may also include information that identifies the direction of traffic and speed limits for each lane as well as information that allows the computing device 110 to determine whether the vehicle has the right of way to complete a particular maneuver (e.g., to complete a turn or cross a lane of traffic or intersection). Map information 200 may further include information on traffic signs, such as traffic lights, stop signs, one-way sign, no-turn sign, etc. Map information 200 may include information about other environmental features such as curbs, buildings, parking lots, driveways, waterways, vegetation, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing device 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing device 110 periodically and continuously as it is generated by the perception system 172. As discussed in further detail below, computing device 110 may use the positioning system 170 to determine the vehicle's location and perception system 172 to detect and respond to objects when needed to reach the location safely.

Figure 3:
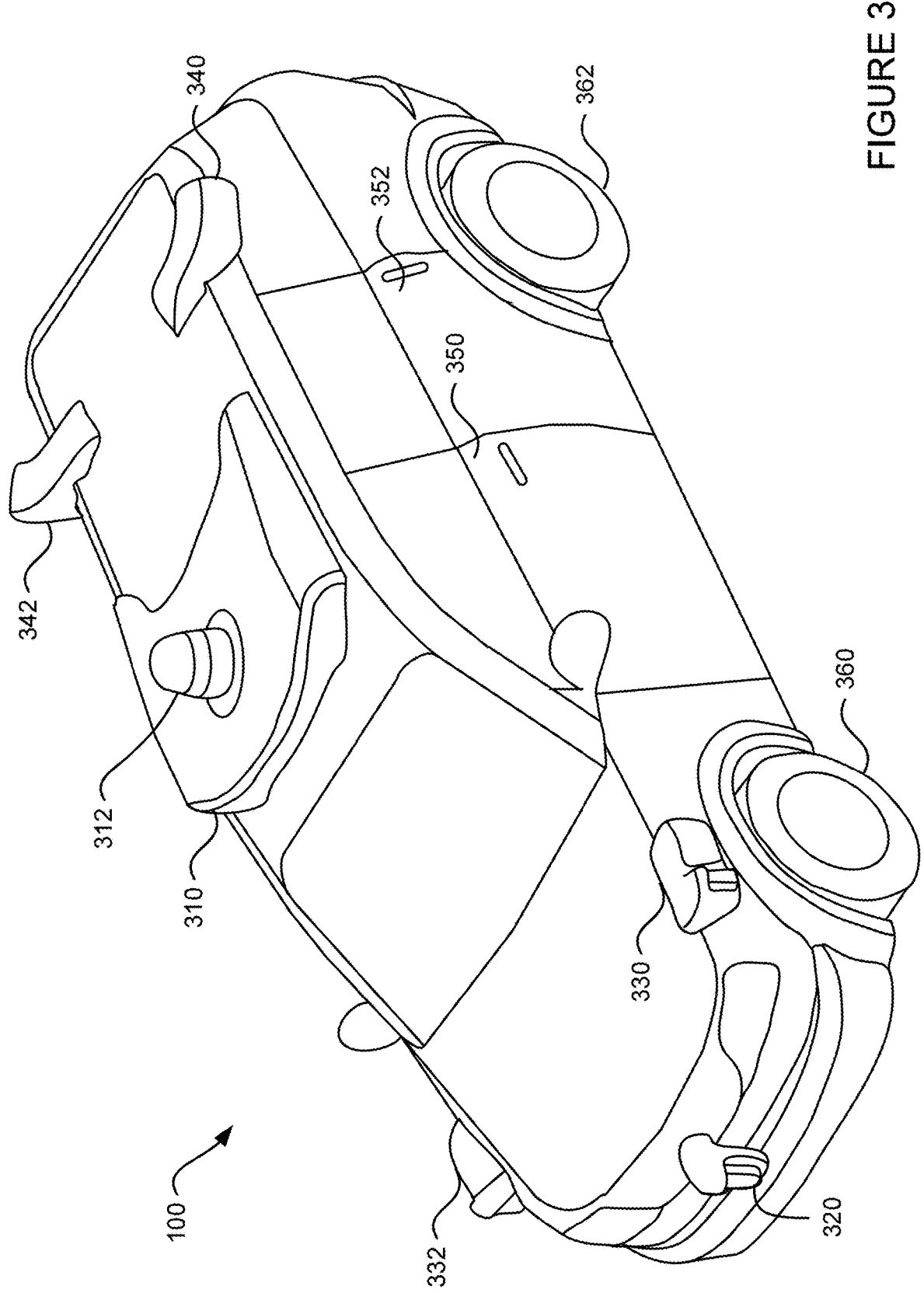
FIG. 3 is an example external view of a vehicle in accordance with aspects of the disclosure.

FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing device 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

Memory 130 may store various models used by computing device 110 to make determinations on how to control vehicle 100. For example, memory 130 may store one or more object recognition models for identifying road users and objects detected from sensor data. For another example, memory 130 may store one or more behavior models for providing the probability of one or more actions being taken a detected object. For another example, memory 130 may store one or more speed planning models for determining speed profiles for vehicle 100 based on map information 200 from navigation system 168 and predicted trajectories of other road users detected by sensor data from perception system 172.

Figure 4:
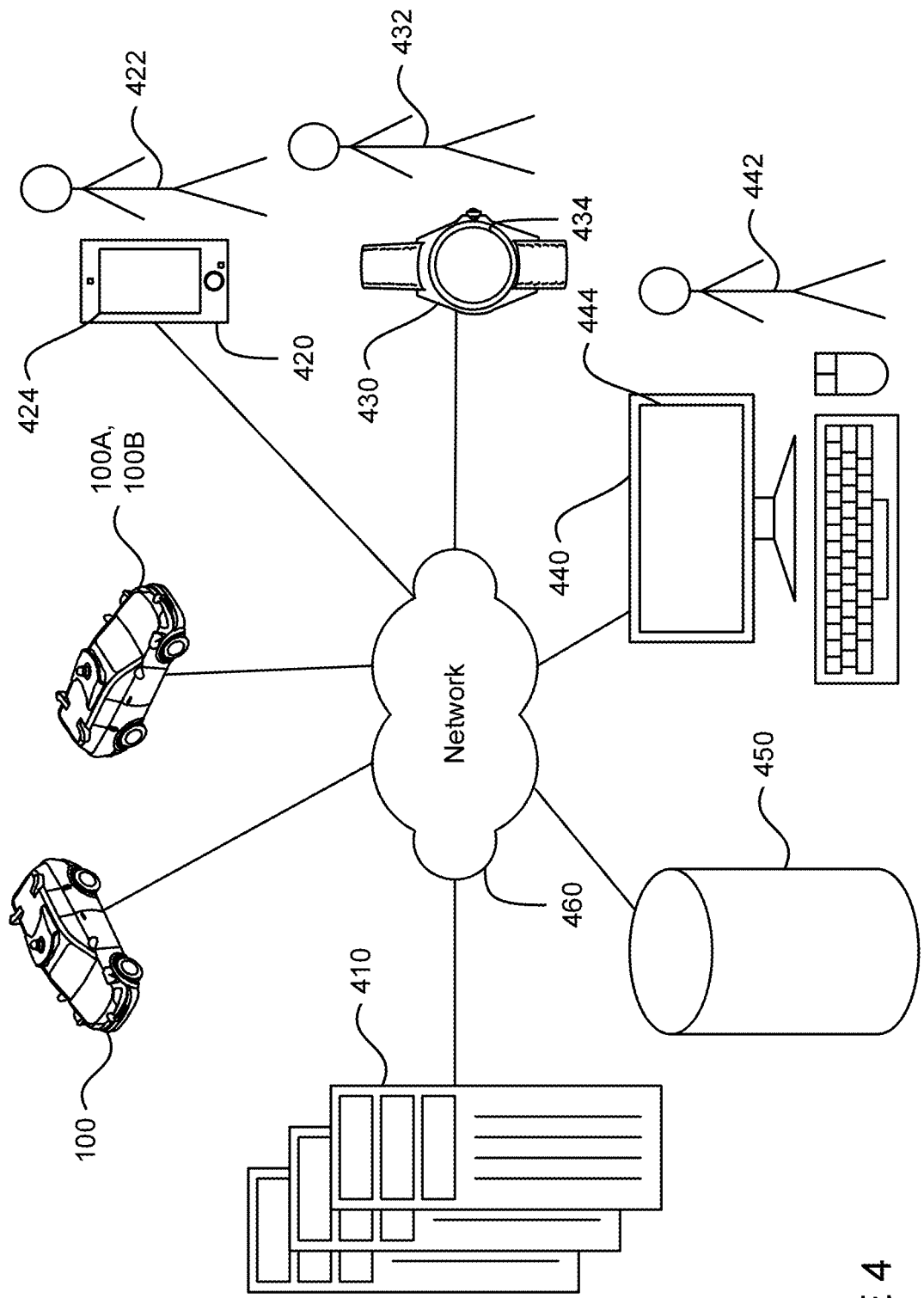
FIG. 4 is an example pictorial diagram of a system in accordance with aspects of the disclosure.
Figure 5:
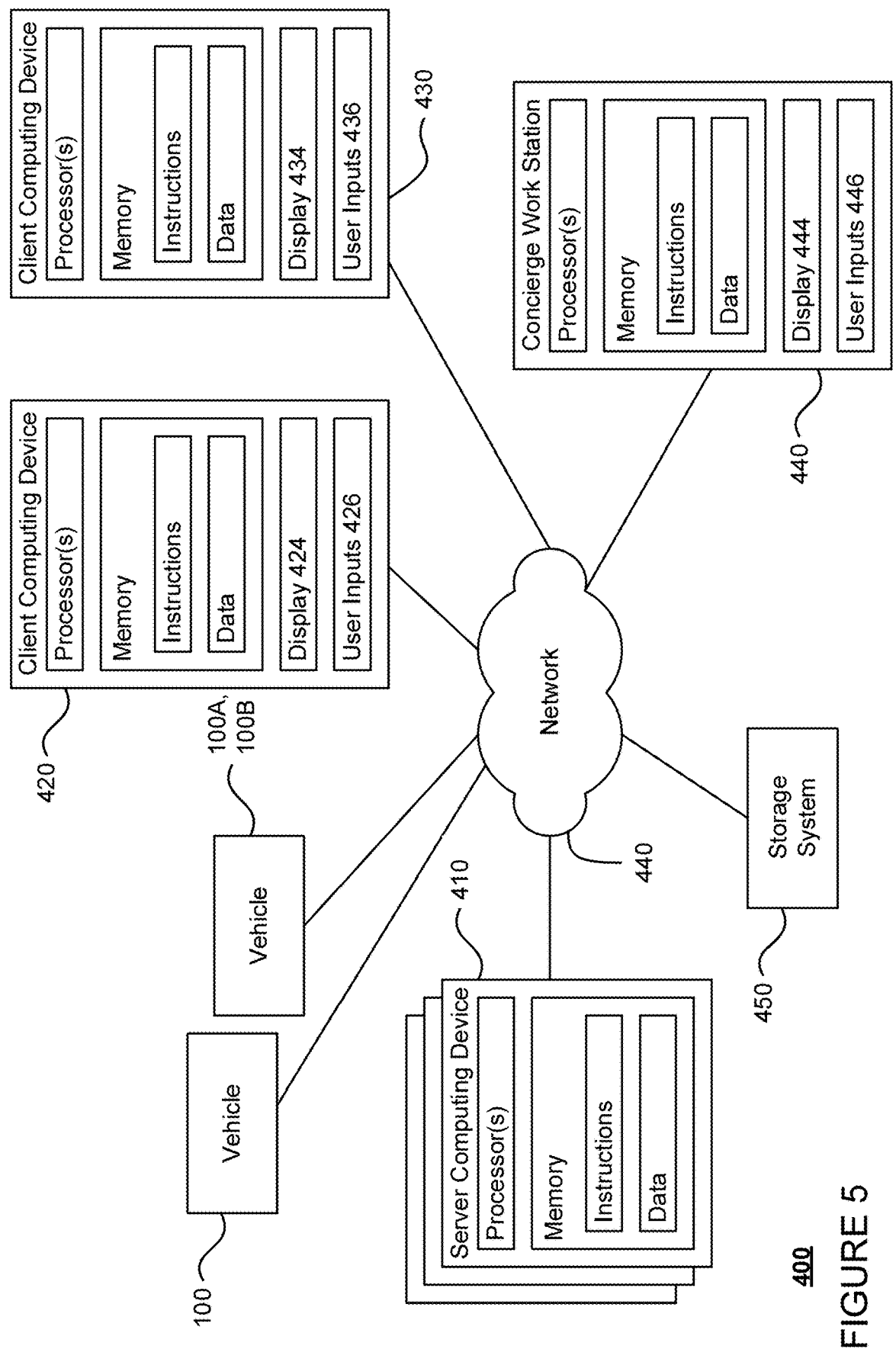
FIG. 5 is an example functional diagram of a system in accordance with aspects of the disclosure.

FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing device 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing device 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a CPU), memory (e.g., RAM and internal hard drives) storing data and instructions, a display such as displays 424, 434, 444 (e.g., a monitor having a screen, a touchscreen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be remote operator work station used by an administrator to provide remote operator services to users such as users 422 and 432. For example, a remote operator 442 may use the remote operator work station 440 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as age information, health information, and user history information about how long it has taken the user to enter or exit vehicles in the past as discussed below.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc. The storage system 450 may further store map information, such as map information 200.

The storage system 450 may also store various models for routing and controlling vehicle 100, such as object recognition models, behavior models, speed planning models, etc. In this regard, the storage system 450 may store data used for training some or all of these models. For example, training data may include images manually labeled with identified objects, videos of trajectories taken by road users in various traffic patterns. The storage system 450 may store other data required for using these models, such as parameters and values.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing device 110, 410, 420, 430, 440, etc.

Example Methods

In addition to the systems described above and illustrated in the figures, various operations will now be described. It should be understood that the following operations do not have to be performed in the precise order described below. Rather, various steps can be handled in a different order or simultaneously, and steps may also be added or omitted.

Figure 6A:
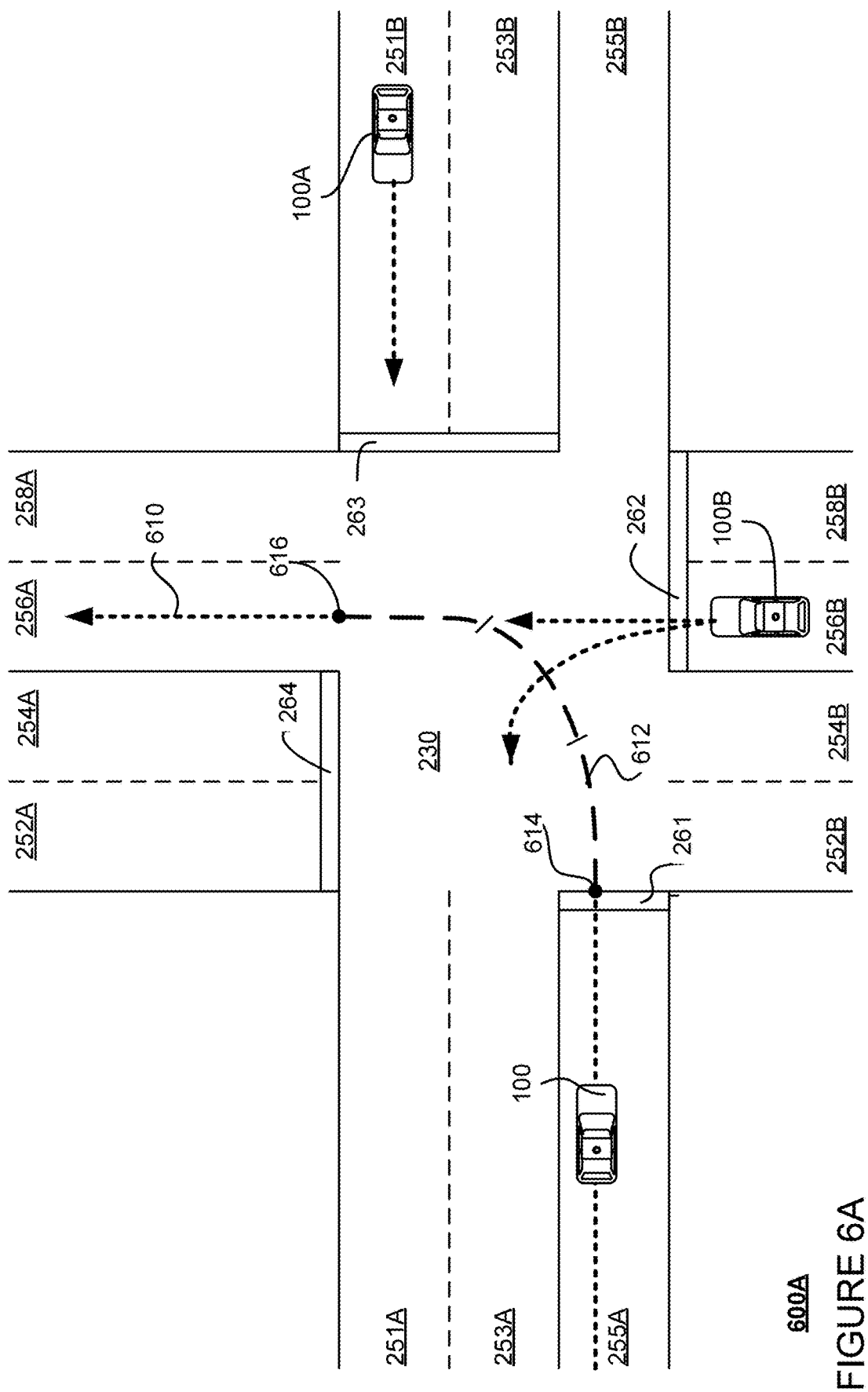
Figure 6C:
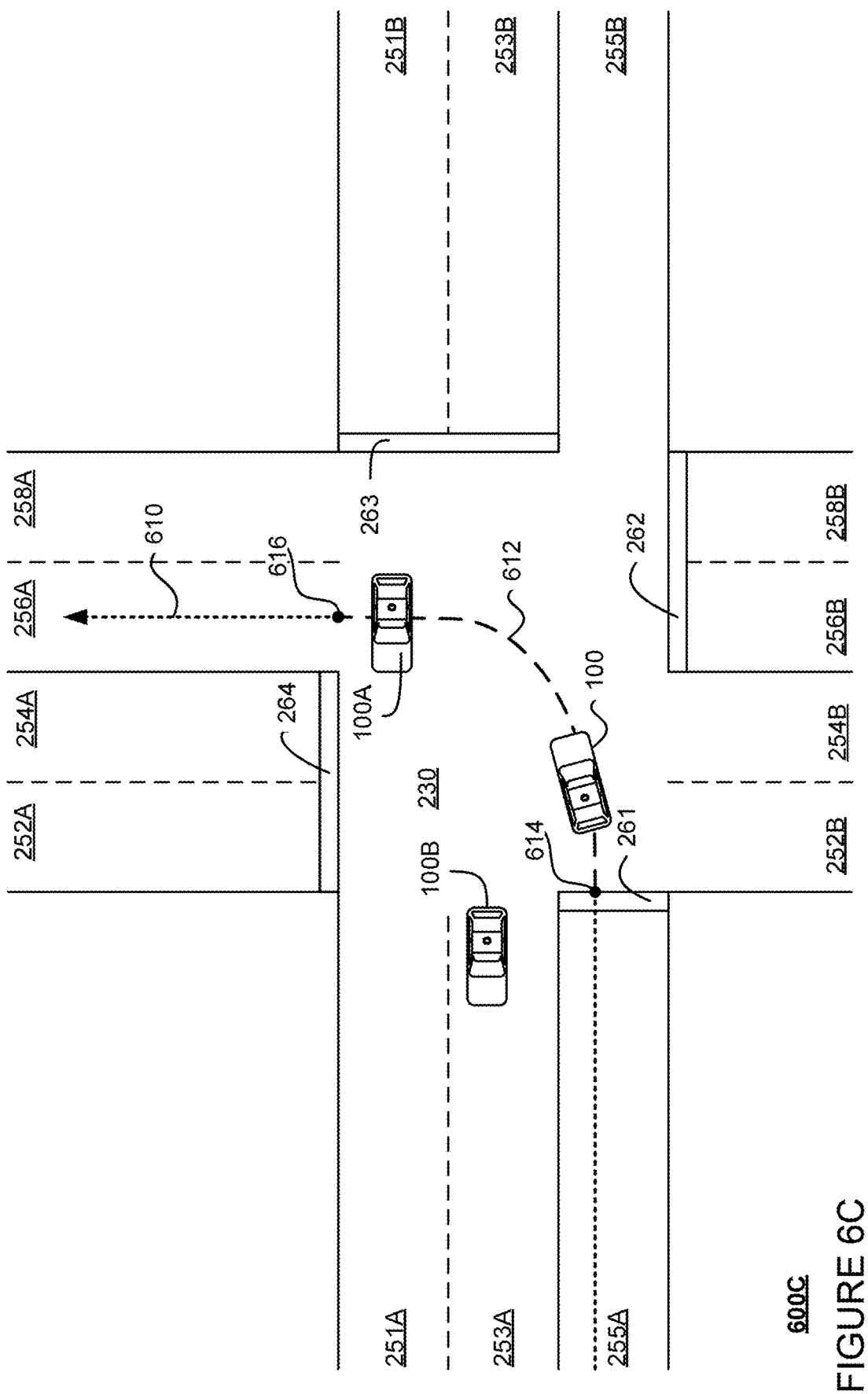

The computing device 110 may maneuver vehicle 100 towards a destination location. In order to do so, computing device 110 may calculate a route based on map information 200 from navigation system 168. Computing device 110 may control vehicle 100 to follow the calculated route. While following the route, computing device 110 may detect various agents in its environment, such as road users and other objects, from sensor data from perception system 172, and predict their behaviors. For example, the behaviors may include possible trajectories of the detected agents, which may be predicted based on sensor data and map information, as illustrated by FIGS. 6A-6C and discussed in detail below. Based on these predicted trajectories, computing device 110 may determine driving solutions for vehicle 100 to safely respond to these detected agents.

FIGS. 6A-6C show example snapshots 600A-600C to illustrate example situations for a portion of the route followed by vehicle 100. For example, FIG. 6B may be a snapshot taken after a time interval has lapsed since the snapshot taken in FIG. 6A for one alternative scenario, and FIG. 6C may be a snapshot taken after a time interval has lapsed since the snapshot taken in FIG. 6A for another alternative scenario. Various features in FIGS. 6A-6C may generally correspond to the shape, location, and other characteristics of features shown in map information 200 of FIG. 2, and labeled as such. Additional features in FIGS. 6A-6C, including various agents such as road users and other objects, are described in detail below. Although these examples are useful for demonstration purposes, they should not be considered limiting.

Referring to FIG. 6A, vehicle 100 is shown following a route 610 (indicated by dotted arrow), where a future increment portion 612 (dashed portion of the arrow) starting at start point 614 in road 210 and ending at end point 616 in road 220 is a left turn through intersection 230. As vehicle 100 approaches intersection 230 in lane 255A, computing device 110 may signal the left turn using the signaling system 166 and determine a driving solution for portion 612. A driving solution for portion 612 may include details on how vehicle 100 should perform the left turn. For example, a driving solution may include a navigational path, a speed profile, an acceleration profile, a jerk profile, a separation distance from other road users or objects, etc.

Computing device 110 may determine a nominal driving solution along future increment portion 612 based on current driving settings, traffic control features, and/or one or more constraints. Current driving settings may include current statuses of various sensors or systems of the vehicle 100, such as the current speed, acceleration, direction, and heading of the vehicle 100. For example, computing device 110 may determine that vehicle 100 is headed straight down lane 255A towards intersection 230, and is 50 m away from stop line 261, and may determine that the nominal driving solution includes driving at about 20 km/hr while turning along portion 612 based on a type of vehicle and the degree of turn. Traffic control features may include features, characteristics, or objects on or near a roadway that provides indications for directing traffic, such as lane lines, signs, traffic lights, speed limits, etc. For example, computing device 110 may determine that the nominal driving solution includes turning from lane 255A into lane 256A, instead for example turning into lane 254A. In addition, computing device 110 may detect or determine that the intersection 230 is a four-way stop, and thus, the nominal driving solution includes starting at start point 614 near the stop line 261 from at least approximately a stopped position.

With respect to the one or more constraints, these one or more constraints may be internal or external. For example, internal constraints may include a maximum discomfort level for passenger in vehicle 100 or a global discomfort level for vehicle 100 and other agents reacting to vehicle 100. With respect to internal constraints, computing device 110 may set a maximum discomfort level allowed for performing the nominal driving solution. The maximum discomfort level may be determined as described in U.S.

application Ser. No. 16/210,652 as incorporated herein, or using other known methods. In some examples, computing device 110 may select a given candidate solution from a plurality of candidate solutions having same or similar vehicle progress based on the given candidate solution having the lowest discomfort level.

External constraints may include any possible changes in an environment of the vehicle that can intersect with or otherwise impact the vehicle's route. For example, possible changes may include movement of road agents, changes to detectability of an area, or changing traffic signals. Movement of road agents, such as vehicles, cyclists, or pedestrians, may be predicted for the future increment as trajectories by the computing device 110. A trajectory may define what a detected agent is likely to do for some brief period into the future, such as the period during which the vehicle is driving through the given portion of the route. A trajectory may include, for example, a position profile, a speed profile, an acceleration profile, a jerk profile, etc. Changes to a detectability of an area may be based on a predicted occlusion, such as a passing agent vehicle or other object that temporarily occludes another agent vehicle in the vehicle's environment. In this case, the occlusion may be predicted based on the predicted trajectory of the passing agent vehicle or the object relative to one or more sensors of the vehicle and the predicted trajectory of the other agent vehicle. In other implementations the predicted occlusion may be based on a limit to a sensor's field of view, such as a blind spot or a diminished field of view due to an external effect. Changing traffic signals, such as traffic lights or handheld stop signs, may be estimated or predicted based on known timings, behavior of detected road agents, or behavior of a sign bearer.

With respect to trajectories of detected agents, computing device 110 may make predictions based on sensor data indicating speed of a detected agent, direction of a detected agent, position of a detected agent, heading of a detected agent, traffic conditions around a detected agent, as well as interactions between the detected agent and various agents and/or vehicle 100. Referring to FIG. 6A, sensor data from perception system 172 may indicate that agent vehicle 100A in lane 251B is about 50 m away from intersection 230, and is driving at 40 km/hr in a straight line headed towards intersection 230 without a turn signal on. As such, computing device 110 may determine that, at its current speed, vehicle 100A will likely reach the intersection at about the same time as vehicle 100. Because the vehicle 100 is signaling a left turn, a first potential trajectory for vehicle 100A is to slow down and stop at stop line 263, and remain stopped to wait for vehicle 100 to make the left turn as shown in FIG. 6B. Since the trajectory of vehicle 100A shown in FIG. 6B yields to or cooperates with the left turn maneuver intended by vehicle 100, which allows for more progress by vehicle 100 along the route, the trajectory of vehicle 100A in FIG. 6B may be referred to as a "cooperating trajectory," and vehicle 100A in this case may be referred to as a "cooperating agent." Although in the example shown in FIG. 6B, the cooperating trajectory of vehicle 100A is shown as including a complete stop, in other examples, other types of trajectories may also be considered as yielding or cooperating. For example, in lane change or lane merge situations, a slight deceleration or merely not accelerating may be considered a yielding or cooperating trajectory.

Computing device 110 may also determine that a second potential trajectory for vehicle 100A may be to stop at stop line 263 and start driving through intersection 230 before the vehicle 100 makes the left turn, as shown in FIG. 6C. Since the trajectory of vehicle 100A shown in FIG. 6C passes vehicle 100 before or during the left turn maneuver intended by vehicle 100, which halts or slows progress by vehicle 100 along the route, the trajectory of vehicle 100A in FIG. 6C may be referred to as a "non-cooperating trajectory," and vehicle 100A in this case may be referred to as a "non-cooperating agent." In addition, other potential trajectories of vehicle 100A includes a right turn onto road 220 or a left turn onto road 220. However, computing device 110 may filter out these trajectories based on an unlikelihood to impact the portion 612 of the vehicle's route and an unlikelihood of occurring, respectively. In other words, these trajectories may not meet a minimum threshold level of risk to the vehicle or a minimum threshold likelihood of occurring, and therefore are filtered or discarded. If vehicle 100A makes a right turn onto road 220, vehicle 100A will most likely not intersect the portion 612 while vehicle 100 is on it because the right turn most likely end on lane 258A (rather than lane 256A for the portion 612) and will most likely be completed before the vehicle 100 turns onto road 220. On the other hand, vehicle 100A is highly unlikely to make a left turn onto road 220 because lane 251B, in which it is traveling, is not a left turn lane according to map information.

The predicted trajectories of detected agents in the environment of the vehicle 100 may be input as external constraints for determining the nominal driving solution. When multiple potential trajectories are predicted for a detected agent, computing device 110 may determine the nominal driving solution based on the cooperating trajectory of the detected agent, ignoring other trajectories for the detected agent for the time being. Therefore, in addition to the current driving settings, traffic control features, and one or more internal constraints mentioned above, the nominal driving solution for vehicle 100 along portion 612 may also be determined based on the cooperating trajectory of vehicle 100A, as shown in FIG. 6B. In other examples, if multiple agents are detected in the environment of vehicle 100, the nominal driving solution may be determined based on all agents following cooperating trajectories. In some alternative implementations, the nominal driving solution may be determined based on the most likely trajectory or trajectories, rather than the cooperating trajectory or trajectories.

As shown in FIG. 6A, computing device 110 may also detect a second agent vehicle 100B in lane 256B of road 220, stopped at stop line 262 with no turn signal. Lane 256B may be for turning left or driving straight according to map information. Computing device 100 may predict a cooperating trajectory of vehicle 100B to be proceeding straight across intersection 230 to lane 256A before vehicle 100 turns left along the portion 612. In addition, computing device 110 may predict a non-cooperating trajectory of vehicle 100B to be turning left onto road 210 into lane 253A, which causes vehicle 100 to slow or stop in intersection 230 before completing the forward progress along the portion 612.

Figure 7:
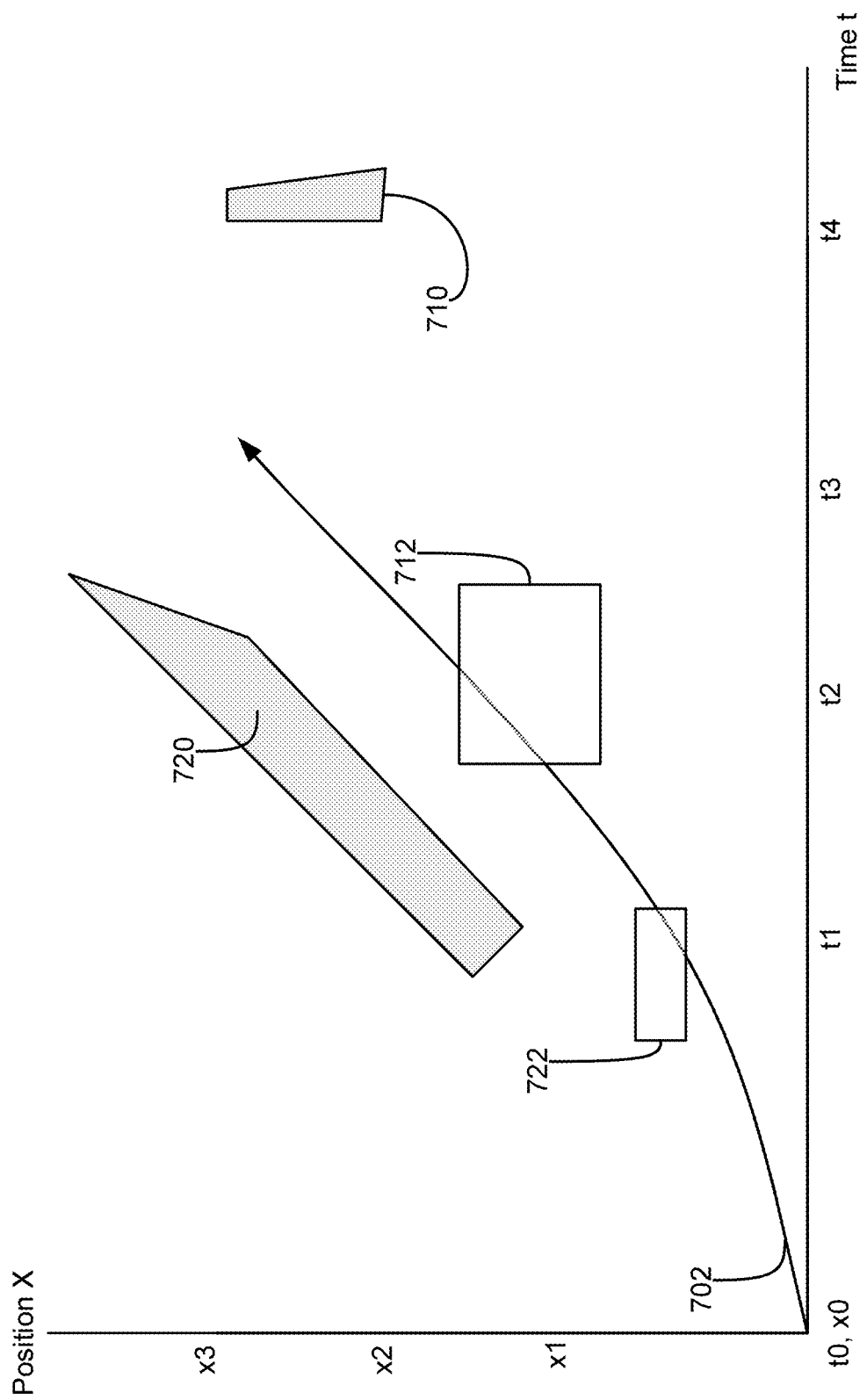
FIG. 7 is an example graphical representation of constraints for a driving solution in accordance with aspects of the disclosure.

FIG. 7 shows an example graphical representation 700 of a nominal driving solution 702 determined for vehicle 100 along portion 612. As shown, representation 700 is a position-time graph where the time axis is divided into t0 (initial time corresponding to start point 614 of portion 612), t1, t2, t3, and t4 and the position axis is divided into x0 (corresponding to start point 614), x1 (corresponding to a first hash mark about one-third through portion 612), x2 (corresponding to a second hash mark about two-thirds through portion 612), and x3 (corresponding to end point 616 of portion 612).

The representation 700 includes the external constraints based on the cooperating and non-cooperating trajectories determined for each detected agent 100A, 100B. Grey shape 710 is drawn to represent the times where locations along portion 612 may be occupied by vehicle 100A according to the cooperating trajectory of vehicle 100A, and white shape 712 is drawn to represent the times where locations may be occupied by vehicle 100A according to the non-cooperating trajectory of vehicle 100A. Likewise, grey shape 720 is drawn to represent the times where locations along portion 612 may be occupied by vehicle 100B according to the cooperating trajectory of vehicle 100B, and white shape 722 is drawn to represent the times where locations may be occupied by vehicle 100B according to the non-cooperating trajectory of vehicle 100B.

Because the nominal driving solution is determined using the cooperating trajectories of detected agents, the nominal driving solution 702 may be drawn in any space that is not occupied by grey shapes 710, 720. The resulting nominal driving solution 702 shows steady progress with minimal discomfort. The initial speed may be slow, shown by the small slope, as the vehicle 100 is starting from a stopped position at x0, t0. A steady acceleration, shown by slight increases in slope from t0 to about t2, corresponds to a low jerk profile. A steady slope reached at about t2 corresponds to a steady speed.

After determining the nominal driving solution, computing device 110 may revise the nominal driving solution using tree policy planning as described in further detail below, so that vehicle 100 may be prepared for any likely scenario unaccounted for in the nominal driving solution. This way, vehicle 100 can mitigate the risk caused by likely scenarios, such as non-cooperating trajectories of detected agents, while making good progress along the route. In particular, a risk factor along the nominal driving solution may be determined where a likely scenario may add a threshold amount of risk to the nominal driving solution. A secondary driving solution for each risk factor may be determined based on the associated scenario. A candidate switching point before the risk factor may be determined where a branching point off the nominal driving solution should occur to avoid the risk factor, where it is predicted that a determination may be made regarding whether the scenario associated with the risk factor has occurred, and/or where it is predicted that a determination may be made regarding whether the scenario associated with the risk factor has been addressed. In some implementations, whichever location associated with the risk factor occurs earliest may be used as the candidate switching point. The nominal driving solution may be revised so that switching to the one or more secondary driving solutions is possible up until the candidate switching point without exceed a maximum discomfort level. For example, the nominal driving solution may be revised to have a slower speed up until the candidate switching point.

To implement tree planning policy, computing device 110 may first determine likely alternate scenarios that are not accounted for in the nominal driving solution. A likely scenario may be based on one or more of the ignored external constraints that were not used in determining the nominal driving solution, such as a second potential trajectory of vehicle 100A or that of vehicle 100B. The ignored external constraints that meet a minimum likelihood threshold and/or a minimum risk threshold may be selected for one or more likely scenarios, and otherwise may be filtered out. Additionally or alternatively, an ignored external constraint may be filtered out when another more likely constraint also effectively factors in the first constraint. For example, a possible right-turn trajectory of vehicle 100A into lane 256A slightly ahead of vehicle 100 turning left onto the same lane is effectively covered by the straight-through trajectory of vehicle 100A, which intersects a larger section of the nominal driving solution 702.

Computing device 110 may determine a first alternate scenario to include a first constraint when it has a highest likelihood of the filtered constraints. For example, the first alternate scenario may include the non-cooperating trajectory of vehicle 100B, a predicted left turn, represented by white shape 722. The first alternate scenario may also include one or more constraints from the filtered constraints that are tied to the first constraint because of logical relationships between the first constraint and the other constraints (such as another vehicle trajectory that includes braking due to the trajectory in the first constraint) or because of proximity in position and time as the first constraint so as to be logically taken into account together.

After determining the first alternate scenario, if additional constraints in the filtered constraints are left, computing device 110 may determine a second alternate scenario including a second constraint that has a highest likelihood of the leftover filtered constraints as well as any other leftover constraints that may be tied to the second constraint. For example, the second alternate scenario may include the non-cooperating trajectory of vehicle 100A, proceeding straight through intersection 230 without waiting for vehicle 100, represented by white shape 712. Further iterations may occur until all of the filtered constraints are used in an alternate scenario.

Computing device 110 may determine a risk factor based on each likely alternate scenario. The risk factor is a future point in time or a future location where a level of risk to the vehicle 100 along the nominal driving solution reaches a maximum threshold due to the possible external constraint. In other words, the risk factor is a predicted point in time or a predicted location that should be avoided in order to mitigate the risk presented by the possible external constraint, if needed. For instance, the level of risk at a given point along the nominal driving solution may be determined based on a likelihood or probability that a detected agent's trajectory is within a minimum distance of the given point or a level of uncertainty or error margin regarding a detected agent's trajectory that falls within the minimum distance of the given point.

Figure 8:
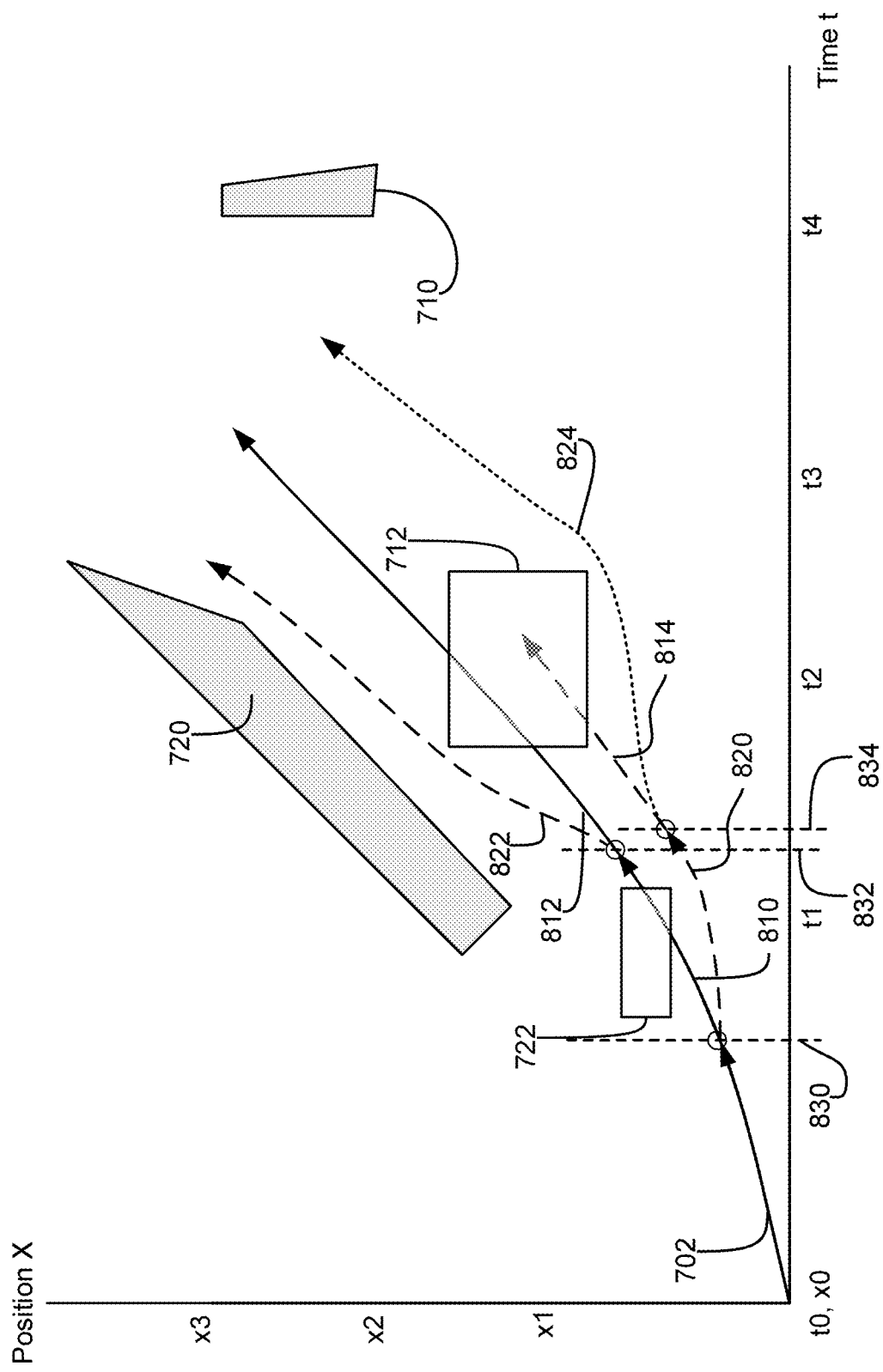
FIG. 8 is an example graphical representation of a tree planning policy for driving solutions determined in accordance with aspects of the disclosure.

As illustrated in the graphical representation 800 in FIG. 8, risk factors 810, 812 may be determined off the nominal driving solution. Risk point 810 may be determined due to the possible non-cooperating trajectory of vehicle 100B, which includes a left turn onto lane 251A that cuts in front of vehicle 100 before vehicle 100 makes the left turn onto lane 256A. The risk is a possible collision if vehicle 100 is operating the nominal driving solution, as shown by the overlap of white shape 722 with nominal driving solution 702. It may be determined that vehicle 100 can safely slow or stop before risk factor 810 and wait for vehicle 100B to pass before continuing along the portion 612 while also satisfying all internal constraints, such as maximum discomfort level. In addition, risk factor 812 may be determined due to the possible non-cooperating trajectory of vehicle 100A, which includes proceeding straight through, which includes cutting in front of vehicle 100 at a later point along the portion 612 than that of vehicle 100B. The risk is a possible collision if vehicle 100 is operating the nominal driving solution, as shown by the overlap of white shape 712 with nominal driving solution 702. It may be determined that vehicle 100 can safely accelerate before risk factor 812 along the portion 612 to clear the intersection before vehicle 100A crosses the intersection while also satisfying all internal constraints.

Computing device 110 may determine a secondary driving solution based on one or more risk factors and the one or more constraints in the corresponding likely alternate scenario. The secondary driving solution may be determined in a same or similar manner as the nominal driving solution, but with different external constraints according to the likely alternate scenario(s) associated with the one or more risk factors. For example, the secondary driving solution 820 may be determined based on the first alternate scenario including the first constraint represented by white shape 722 of the non-cooperating trajectory of vehicle 100B.

To determine the secondary driving solution, computing device 110 may also identify a candidate switching point where the secondary driving solution starts to branch off the nominal driving solution. A candidate switching point may be a point in time or location preceding the corresponding risk factor(s) where the determination regarding the occurrence or non-occurrence of the scenario associated with the risk factor may be made. This determination may be reached when the confidence level that the alternate scenario is or is not occurring reaches a high threshold, such as 90% or more. In particular, the candidate switching point may be identified based on where perception system 172 is able to detect an agent behavior that confirms which trajectory is the actual agent trajectory. This confirmation may be reached when there is a high confidence level, such as 90% or more, that the agent is on a particular trajectory, which means the determination for which scenario is occurring can be reached. Where the perception system 172 may be able to detect the agent behavior may correspond to when the agent behavior is predicted to occur and where the perception system 172 or how much space is needed for vehicle 100 to adjust to the agent behavior. The amount of space needed may be based on a distance required to the vehicle 100 to stop before an agent position or swerve around an agent position and/or a distance required to react to the agent behavior. The candidate switching point may be modified based on when an occlusion is predicted removed between the perception system 172 and the agent vehicle when such an occlusion exists or when a traffic signal is predicted to change when the traffic signal applies to the agent vehicle. In some implementations, the candidate switching point may be after a reaction time of the vehicle 100 elapses after the perception system is able to detect the agent behavior. In some scenarios, a plurality of candidate switching points may be processed as one aggregate candidate switching point that takes into account all the constraints for the corresponding risk factors, which increases efficiency and saves computational resources.

For example, candidate switching point 830 may be identified for secondary driving solution 820 based on when the vehicle 100B is predicted to start to turn towards lane 253A in the non-cooperating trajectory. Candidate switching point 832 may be identified for secondary driving solution 822 based on when the vehicle 100A is predicted to start to enter intersection 230 after stopping at stop line 263. In this example, the candidate switching point 832 is already positioned after the vehicle 100B crosses between vehicle 100A and vehicle 100. However, if the candidate switching point is positioned during a point in time where the vehicle 100B occludes the view of vehicle 100A from perception system 172 of vehicle 100, the candidate switching point may be moved to a point after the vehicle 100B passes between vehicle 100A and vehicle 100.

Computing device 110 may revise the nominal driving solution based on a next candidate switching point so that the vehicle 100. In particular, the revision to the nominal driving solution allows the vehicle 100 to be capable of taking a corresponding secondary driving solution at the next candidate switching point in theory. In some examples, revising the nominal driving solution may include decreasing the speed of the vehicle 100 prior to the next candidate switching time or alternatively includes increasing the speed of the vehicle 100 prior to the next candidate switching time. In other examples, revising the nominal driving solution may include altering an internal constraint, such as maximum discomfort level, to allow for a temporary adjustment between driving solutions. It may also be determined that no revision to the nominal driving solution is needed. For the nominal driving solution 702, at time t0 the next candidate switching point is candidate switching point 830. Revising the nominal driving solution 702 may include determining a slower speed for the speed profile of the nominal driving solution 702 for the portion between t0 and the candidate switching point 830 to allow for a more comfortable adjustment to secondary driving solution 820 or other updated driving solution, if needed.

If at or before the candidate switching point 830 it is determined that vehicle 100B is crossing straight through the intersection (cooperating trajectory), the computing device 110 may then perform a next iteration of the tree planning policy using this information (cooperating trajectory) for a new driving solution and plan for risk factors or candidate switching points further down the road.

Alternatively, if at or before the candidate switching point 830 it is determined that vehicle 100B is turning left (non-cooperating trajectory), computing device 110 may perform a new iteration of the tree planning policy using the new information (non-cooperating trajectory) in the steps described above. The result of using the new iteration of the tree planning policy may be same or similar to the driving solution 820.

When no determination can be or is made at a candidate switching point, computing device 110 may select a most conservative, or cautious, driving solution to operate vehicle 100 through a first section of portion 612.

Once the tree planning policy is determined for a given portion of the route, such as the first section of portion 612, computing device 110 may repeat the steps described herein continually or at regular intervals. The computing device 110 can therefore plan and adjust the driving solution based on new information received or collected by the perception system 172, such as the vehicle 100 moves along the route. Additionally or alternatively, computing device 110 may determine the tree planning policy for portions of the route as they come into view of perception system 172 of vehicle 100. If the vehicle 100 reaches a point past the risk factor 810 along the nominal driving solution 702, the computing device 110 may determine a secondary driving solution 822 based on the second alternate scenario including the second constraint represented by white shape 712 of the non-cooperating trajectory of vehicle 100A, risk factor 812, and candidate switching point 832. If the vehicle 100 reaches a point along the secondary driving solution 820 after detecting that the non-cooperating trajectory of vehicle 100B, the computing device 110 may determine a secondary driving solution 824 based on the second alternate scenario including the second constraint represented by white shape 712, risk factor 814, and candidate switching point 834.

In some examples, a driving solution model may be used for determining a plurality of profiles for a driving solution. The driving solution model may be used by computing device 110 or by a remote computing device, such as server computing device 410. For example, the driving solution model may generate a speed profile with a speed value and other profiles for regular time increment into the future route for the vehicle. Such a driving solution model may be trained using map information from navigation system 168 and sensor data generated by perception system 172 as well as similar systems on other autonomous vehicles that include data sets for driving solutions used for various maneuvers performed on different roads with different traffic patterns. The training data may be labeled with discomfort levels and other internal constraints based on the data sets or may be manually generated by a remote operator. The sensor data may include all of the data generated by the perception system 172 before and during a maneuver, or more streamlined information, such as dimensions and shapes of the road on which a maneuver is performed, the pose, velocity, acceleration and similar data for other road users also on the road where the maneuver is performed. The behavior models may include machine learning models, such as those for a deep neural network.

Similarly, computing device 110 may use one or more behavior models to both predict alternative trajectories of detected agents and determine a likelihood or probability for each trajectory. Such a behavior model may be trained using map information from navigation system 168 and sensor data generated by perception system 172 as well as similar systems on other autonomous vehicles including data sets for agent trajectories (stopping, yielding, passing, turning, etc.) performed on different roads with different traffic patterns. These labels may be generated based on the data sets or generated based on determinations manually made by remote operators. The sensor data may include all of the data generated by the perception system 172 before and during a trajectory, or more streamlined information, such as dimensions and shapes of the road on which a trajectory is performed, the pose, velocity, acceleration and similar data for other road users also on the road where the trajectory is performed. The behavior models may include machine learning models, such as a deep neural network.

Figure 9:
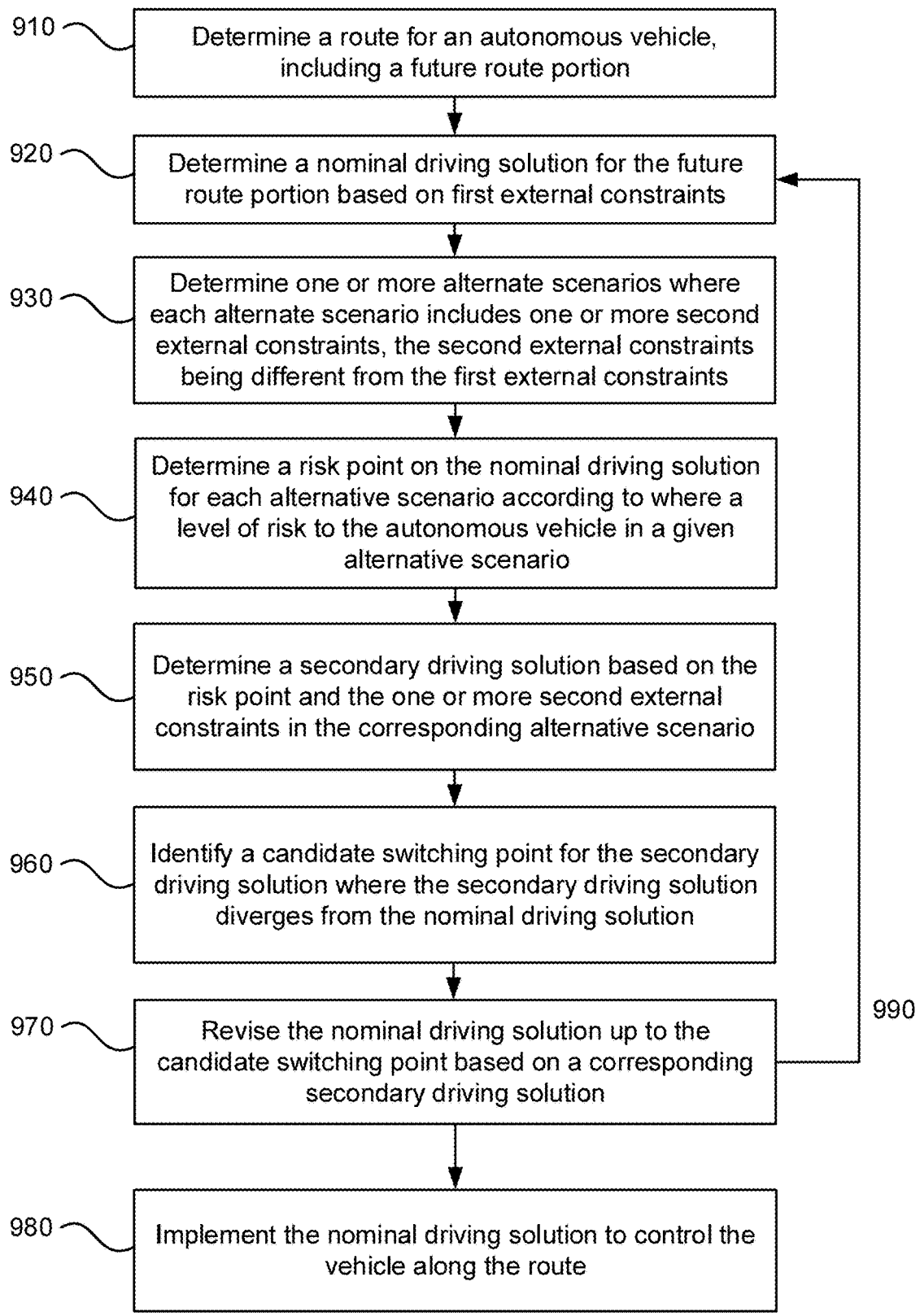
FIG. 9 is an example flow diagram in accordance with aspects of the disclosure.

FIG. 9 is a flow diagram 900 summarizing the example approach illustrated in FIG. 8, which may be performed by one or more processors such as processors 120 of computing device 110. Alternatively, one or more processors of computing devices 410, 420, 430, 440 may be used to perform one or more steps described below. In block 910, a route for an autonomous vehicle may be determined, including a future route portion of the route. The future route portion may be a next route portion for the autonomous vehicle to navigate. In block 920, a nominal driving solution is determined for the future route portion of the route based on first external constraints. External constraints may include predicted trajectories of detected agents in the environment of the vehicle. Determining the nominal driving solution may include selecting one or more first external constraints, such as a given trajectory of a given agent, that allows the most progress of the autonomous vehicle along the future route portion from a plurality of possible external constraints, such as other predicted trajectories for the given agent.

In block 930, one or more alternate scenarios may be determined where each alternate scenario includes one or more second external constraints, the second external constraints being different from the first external constraints. The second external constraints may satisfy a minimum likelihood or probability of occurring and also may satisfy a minimum level of risk posed to the vehicle along the future route portion. Second external constraints that overlap in time and space with another more likely second external constraint may be removed. A first alternate scenario may have a first subset of second external constraints, and a second alternate scenario may have a second subset of second external constraints. In block 940, a risk factor on the nominal driving solution may be determined for each alternative scenario according to where a level of risk to the autonomous vehicle exceeds a maximum level of risk in a given alternative scenario. In block 950, a secondary driving solution may be determined based on each risk factor and the one or more second external constraints in a corresponding alternative scenario. Determining the secondary driving solution may include identifying a candidate switching point where the secondary driving solution starts to branch off the nominal driving solution at block 960. The candidate switching point is a point in time or a location preceding the corresponding risk factor where the secondary driving solution should start diverging from the nominal driving solution to avoid the risk factor, where a determination a determination regarding whether the scenario associated with the risk factor has occurred can be made, and/or a determination regarding whether the scenario associated with the risk factor has been addressed can be made. This may be a point in time or location where enough information is received to make one or more of these determinations, such as detecting a new direction or pose of a detected agent to confirm a trajectory of the detected agent.

In block 970, the nominal driving solution may be revised up to the identified candidate switching point to better prepare the autonomous vehicle to possibly use a secondary driving solution or a similar driving solution, if needed. In block 980, the nominal driving solution may be implemented by the computing device 110 to control the vehicle 100 along the route. The process may be repeated, as shown by arrow 990, right after the nominal driving solution is revised or may be repeated for a new future route portion at set intervals, such as whenever the perception system 172 collects new information. The new future route portion may overlap with a previous future route portion or may be subsequent to the previous future route portion.

The features described above may allow for an autonomous vehicle to be able navigate assertively while mitigating the risk for any unlikely-but-potentially-high-severity collisions. The vehicle as described herein will have the ability to switch to an alternative trajectory, if needed. This alternative trajectory may still provide as comfortable a ride as possible for a passenger of the vehicle. The autonomous vehicle is able to proceed along a route safely without having to slow or stop as frequently to account for the uncertain behavior of other agents on the road. In addition, because the tree planning policy creates a plurality of scenarios with fewer constraints for each scenario, which means the computations required at the vehicle are easier and potentially faster than solving for all the possible constraints. Processing may therefore be performed more efficiently and with fewer resources.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for operating an autonomous vehicle, the method comprising:
   detecting, by one or more computing devices, an agent vehicle in an environment of the autonomous vehicle;
   determining, by the one or more computing devices, a nominal driving solution for the autonomous vehicle along a portion of a route on a road based on one or more first external constraints, the one or more first external constraints including a first predicted trajectory of a plurality of possible trajectories for the agent vehicle;
   determining, by the one or more computing devices, an alternate scenario that includes one or more second external constraints that are different from the one or more first external constraints, the one or more second external constraints including a second predicted trajectory of the plurality of possible trajectories for the agent vehicle;
   determining, by the one or more computing devices, a risk factor on the nominal driving solution for the alternate scenario;
   determining, by the one or more computing devices, a secondary driving solution based on the risk factor and the one or more second external constraints in the alternate scenario;
   identifying, by the one or more computing devices, a candidate switching point where the secondary driving solution diverges from the nominal driving solution;
   revising, by the one or more computing devices, the nominal driving solution up to the candidate switching point based on the secondary driving solution; and
   operating, by the one or more computing devices, the autonomous vehicle based on the revised nominal driving solution.

2. The method of claim 1, wherein the determining the nominal driving solution includes selecting the one or more first external constraints that allow a longest distance traveled by the autonomous vehicle along the portion of the route.

3. The method of claim 1, wherein the determining the nominal driving solution includes selecting the one or more first external constraints that are most likely to occur along the portion of the route.

4. The method of claim 1, wherein the determining of the alternate scenario includes selecting the one or more second external constraints based on whether the one or more second external constraints meet a minimum threshold likelihood of occurring.

5. The method of claim 1, wherein the determining of the alternate scenario includes selecting the one or more second external constraints based on whether the one or more second external constraints meet a minimum threshold level of risk posted to the autonomous vehicle along the portion of the route.

6. The method of claim 1, wherein the determining the risk factor is based on where along the portion of the route that a level of risk to the autonomous vehicle posed by the alternate scenario exceeds a maximum threshold level of risk.

7. The method of claim 1, wherein the candidate switching point is where a threshold confidence level is reached regarding whether the alternate scenario has occurred.

8. The method of claim 1, wherein the revising of the nominal driving solution includes adjusting a speed profile to prepare the autonomous vehicle for a potential switch to the secondary driving solution.

9. A system comprising:
   a perception system; and
   one or more computing devices configured to:
      detect, using the perception system, an agent vehicle in an environment of an autonomous vehicle;
      determine a nominal driving solution for the autonomous vehicle along a portion of a route on a road based on one or more first external constraints, the one or more first external constraints including a first predicted trajectory of a plurality of possible trajectories for the agent vehicle;
      determine an alternate scenario that includes one or more second external constraints that are different from the one or more first external constraints, the one or more second external constraints including a second predicted trajectory of the plurality of possible trajectories for the agent vehicle;
      determine a risk factor on the nominal driving solution for the alternate scenario;
      determine a secondary driving solution based on the risk factor and the one or more second external constraints in the alternate scenario;
      identify a candidate switching point where the secondary driving solution diverges from the nominal driving solution;
      revise the nominal driving solution up to the candidate switching point based on the secondary driving solution; and
      operate the autonomous vehicle based on the revised nominal driving solution.

10. The system of claim 9, wherein the nominal driving solution is determined based on the one or more first external constraints that allow a longest distance traveled by the autonomous vehicle along the portion of the route.

11. The system of claim 9, wherein the nominal driving solution is determined based on the one or more first external constraints that are most likely to occur along the portion of the route.

12. The system of claim 11, wherein the nominal driving solution is revised based on an adjusted speed profile that prepares the autonomous vehicle for a potential switch to the secondary driving solution.

13. The system of claim 9, wherein the alternate scenario is determined based on the one or more second external constraints that have a minimum threshold likelihood of occurring and based on the one or more second external constraints that have a minimum threshold level of risk posted to the autonomous vehicle along the portion of the route.

14. The system of claim 9, wherein the risk factor is determined based on where along the portion of the route that a level of risk to the autonomous vehicle posed by the alternate scenario exceeds a maximum threshold level of risk.

15. The system of claim 9, wherein the candidate switching point is where a threshold confidence level is reached regarding whether the alternate scenario has occurred.

16. The system of claim 9, further comprising the autonomous vehicle.

17. A non-transitory, tangible computer-readable medium on which computer-readable instructions of a program are stored, the instructions, when executed by one or more computing devices, cause the one or more computing devices to perform a method for operating an autonomous vehicle, the method comprising:

detecting an agent vehicle in an environment of the autonomous vehicle;

determining a nominal driving solution for the autonomous vehicle along a portion of a route on a road based on one or more first external constraints, the one or more first external constraints including a first predicted trajectory of a plurality of possible trajectories for the agent vehicle;

determining an alternate scenario that includes one or more second external constraints that are different from the one or more first external constraints, the one or more second external constraints including a second predicted trajectory of the plurality of possible trajectories for the agent vehicle;

determining a risk factor on the nominal driving solution for the alternate scenario;

determining a secondary driving solution based on the risk factor and the one or more second external constraints in the alternate scenario;

identifying a candidate switching point where the secondary driving solution diverges from the nominal driving solution;

revising the nominal driving solution up to the candidate switching point based on the secondary driving solution; and operating the autonomous vehicle based on the revised nominal driving solution.

18. The medium of claim 17, wherein the determining the nominal driving solution includes selecting the one or more first external constraints that allow a longest distance traveled by the autonomous vehicle along the portion of the route.

19. The medium of claim 17, wherein the determining the nominal driving solution includes selecting the one or more first external constraints that are most likely to occur along the portion of the route.

20. The medium of claim 17, wherein the determining the risk factor is based on where along the portion of the route that a level of risk to the autonomous vehicle posed by the alternate scenario exceeds a maximum threshold level of risk.

* * * * *